Nov. 12, 1968    J. A. GRACEFFO    3,409,985
DENTURE DEVICES WITH SUCTION CHECK VALVE MEANS
Filed Jan. 17, 1964    2 Sheets-Sheet 1

INVENTOR.
JOSEPH A. GRACEFFO,
BY
McMorrow, Berman + Davidson
ATTORNEYS.

Nov. 12, 1968  J. A. GRACEFFO  3,409,985
DENTURE DEVICES WITH SUCTION CHECK VALVE MEANS
Filed Jan. 17, 1964  2 Sheets-Sheet 2
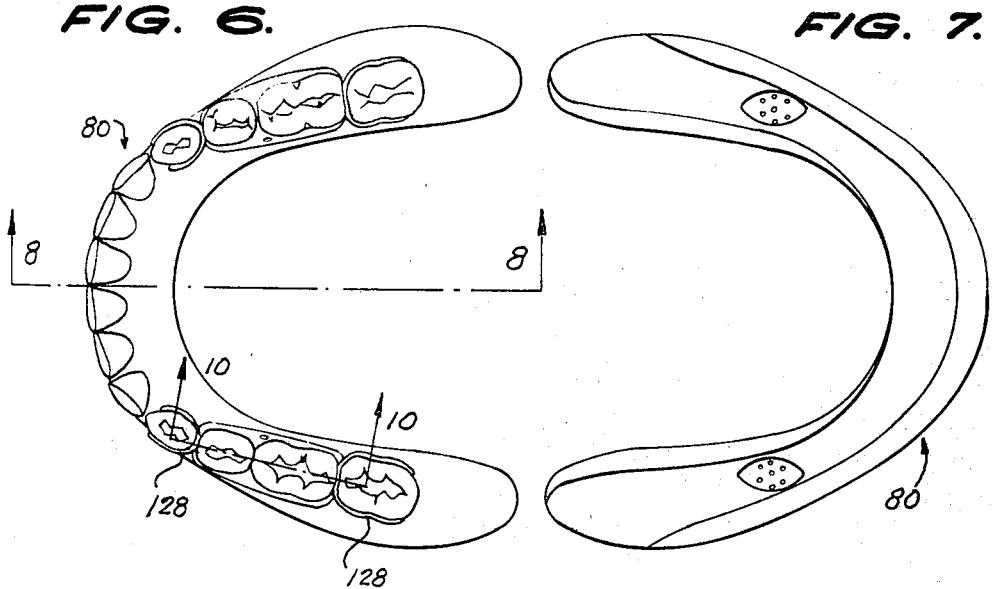
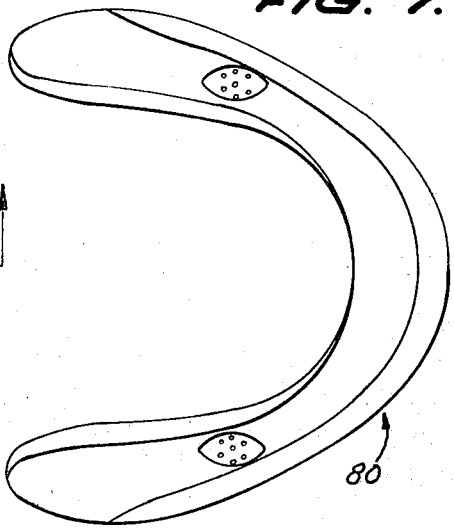
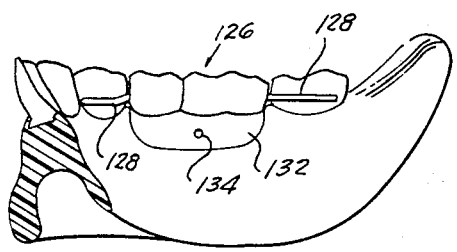
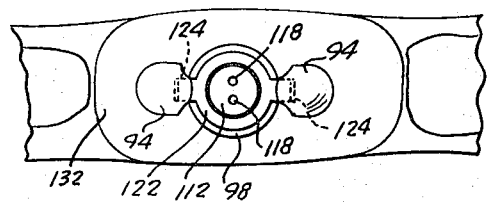
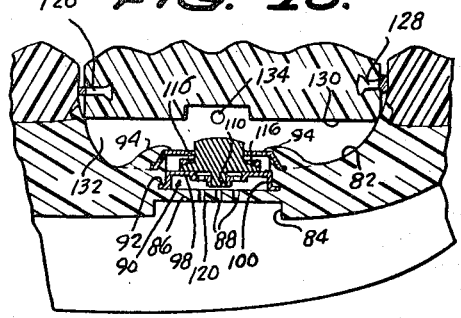
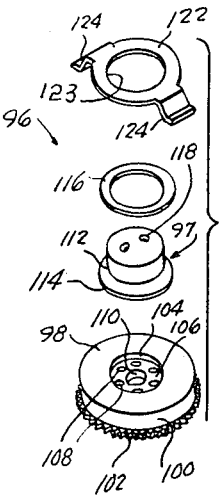
INVENTOR.
JOSEPH A. GRACEFFO,
BY
McMorrow, Berman & Davidson
ATTORNEYS.

United States Patent Office 3,409,985
Patented Nov. 12, 1968

3,409,985
DENTURE DEVICES WITH SUCTION CHECK VALVE MEANS
Joseph A. Graceffo, 40 Wallace Ave., Auburn, N.Y. 13021
Filed Jan. 17, 1964, Ser. No. 338,495
6 Claims. (Cl. 32—3)

This invention relates to the general field of dentistry and, more specifically, the instant invention pertains to the provision of dental plates or artificial teeth.

It is well-known in this art that persons using artificial dentures encounter considerable difficulty in maintaining the same against the gingival tissues of the mouth in such a manner as to prevent their shifting or even actual displacement. The use of adhesive powders or pastes does little to alleviate this condition. It appears that this difficulty is primarily the result of the accumulation of air and saliva between the tissue side of the dentures and adjacent portions of the gingival tissues of the mouth. Thus, one of the primary objects of this invention is to provide, in denture plates, both upper and lower, means for more securely anchoring dental plates to the gingival tissues which, at the same time, affords the user the maximum comfort.

Another object of this invention is to provide dental plates with check valves, operable by the user, whereby air and saliva may be withdrawn from between the tissue side of the dentures and the adjacent gingival tissues to pass through the valves into the mouth while, substantially at the same time, creating a negative pressure or partial vacuum therebetween, it being understood that the expressions "negative pressure" and "partial vacuum" refer to a pressure lower than atmospheric pressure.

Still another object of this invention is to provide check valves for dentures which are spring-biased to their closed positions or which are closed and held closed by the force of gravity.

It is another object of this invention to provide in dental plates valve means of the type described where the degree of negative pressure or vacuum may be regulated to suit the comfort of the user.

A further object of this invention is to provide a lower dental plate with check valves which are entirely concealed and an upper dental plate with a check valve which presents only a relatively small closure and operating button which is substantially flat and smooth, and which does not offer any discomfort to the user.

This invention contemplates, as a still further object thereof, the provision of check valve means for dental plates which are non-complex in construction and assembly.

Further objects and advantages of the instant invention will become more evident from a consideration of the following specification when read in conjunction with the annexed drawings, in which:

FIGURE 6 is a bottom plan view of a lower denture plate with the check valve constructed in accordance with this invention installed therein;

FIGURE 7 is a top plan view of the plate shown in FIGURE 6;

FIGURE 8 is a cross-sectional view, partly in elevation, FIGURE 8 being taken substantially on the horizontal plane of line 8—8 of FIGURE 6, looking in the direction of the arrows;

FIGURE 9 is a fragmentary top plan view of the lower denture, a portion thereof having been removed to illustrate the positioning of the lower denture check valve;

FIGURE 10 is a fragmentary detail cross-sectional view illustrating the check valve construction; and FIGURE 11 is an exploded perspective view of the check valve shown in FIGURE 10.

Figure 1:
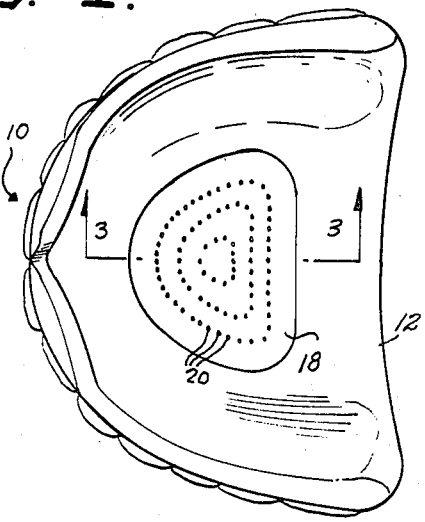
FIGURE 1 is a top plan view of an upper denture plate illustrating one feature thereof.
Figure 2:
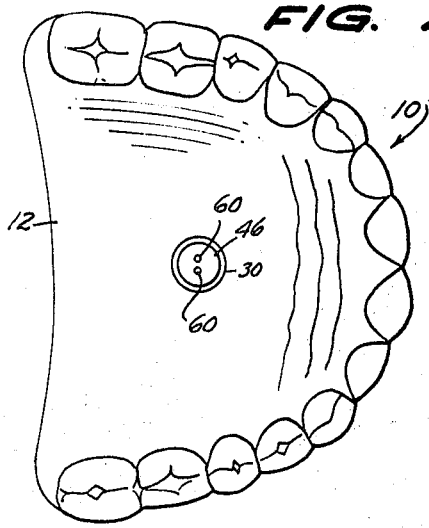
FIGURE 2 is a bottom plan view of the upper denture plate shown in FIGURE 1 and illustrating still another feature of the invention.

Referring now more specifically to FIGURES 1 to 5, inclusive, reference numeral 10 designates, in general, an upper dental plate constructed in accordance with this invention. The upper dental plate is formed, preferably, of a plastic material, such as acrylic, but any other desirable material may be employed in carrying out this invention.

Figure 3:
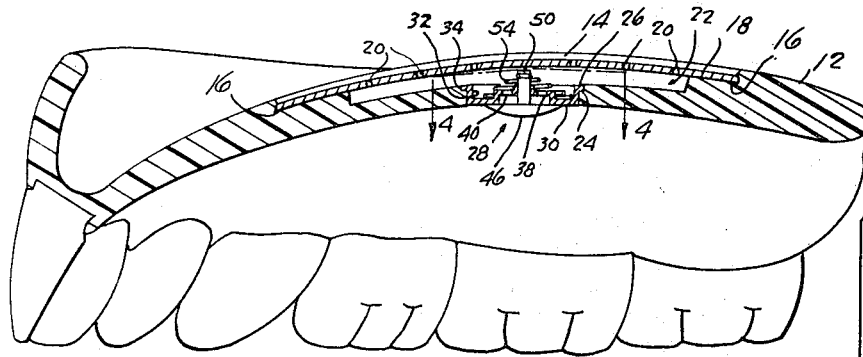
FIGURE 3 is an enlarged detail cross-sectional view, FIGURE 3 being taken substantially on the horizontal plane of line 3—3 of FIGURE 1, looking in the direction of the arrows.
Figure 4:
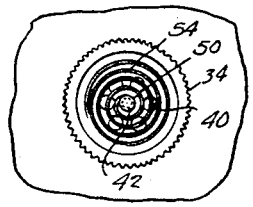
FIGURE 4 is a top plan view of the check valve constructed in accordance with this invention, FIGURE 4 being taken substantially on the horizontal plane of line 4—4 of FIGURE 3, looking in the direction of the arrows.
Figure 5:
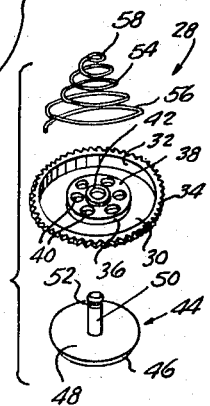
FIGURE 5 is an exploded perspective view showing the internal construction of the check valve.

The denture plate 10 is seen to include a palate plate 12 of the usual construction, the same being shaped to fit comfortably within the user's mouth and is normally disposed adjacent the palatal tissue. As is seen in FIGURES 1 and 3, the central portion of the palate plate 12 at the upper side thereof is formed with a substantially triangular recess 14 and the peripheral sides thereof are provided with a continuous under-cut indicated at 16. Reference numeral 18 denotes a substantially triangular cover member having a plurality of passages 20 extending transversely therethrough arranged in a triangular pattern which is essentially congruent with respect to the cover member 18.

Underlying the cover member 18 is a cavity 22 having a configuration complementing the cover member 18, and the palate plate 12 is provided with a cylindrical opening 24 extending transversely therethrough which opens into an enlarged seat 26 that, in turn, opens toward the cover member 18 substantially centrally thereof.

Reference numeral 28 (see FIGURES 3 and 5) denotes, in general, a check valve assembly which includes a substantially discoidal element 30 having circumferential sidewall 32 projecting from a side thereof and at its peripheral marginal edge. The outer end of the sidewall 32 terminates in a circumferential outwardly-extending milled flange 34. The central portion of the discoidal member 30 is expressed in the direction of the flange 34 to form a second circumferential sidewall 36 across which extends a cylindrical top wall 38 having a plurality of openings 40 extending transversely therethrough, and a centrally-located substantially hollow cylindrical boss 42 projects laterally therefrom.

The check valve is indicated, generally, by reference numeral 44, and is seen to comprise an arcuately-shaped main body portion 46 having a flat circular side 48 from the central portion of which laterally-projects an elongated cylindrical valve stem 50. The valve stem 50, adjacent the outer end thereof, is formed with a cylindrical groove 52. In assembly, the stem 50 is passed through the boss 42 and extends beyond the top wall 38 with the flat side 48 thereof normally engaging that side of the discoidal element 30 remotely-disposed with respect to the flange 34.

Reference numeral 54 indicates a helicoidal spring having a conical configuration. The spring 54 surrounds the stem 50 with the base convolution 56 abutting the discoidal element 30. The apex end of the spring 54 terminates in a loop 58 adapted to seat in the groove 52. The spring 54 is under tension so that the flat circular side 48 of the main body portion 46 is constantly biased for movement toward the discoidal element 30 to close thereagainst.

The valve assembly 28 is disposed within the opening 24, the sidewall 32 engaging therein with the milled flange 34 being seated within the seat 26. As is seen in FIGURE 3, the upper end of the valve stem 50 underlies the cover member 18 in vertically-spaced relation relative thereto.

With the upper denture in place in the user's mouth, the valve 28 enables the user to easily and quickly, through a simple suction action of the tongue, to withdraw and expel all air and saliva which may be trapped between the tissue side of the upper denture and the gingival tissues of the mouth. In ordinary dentures, the air and saliva trapped between the tissue side of the denture and the gingival tissue of the mouth prevent the formation of sufficient negative pressure therebetween, thereby limiting the cohesion and retention of the denture. The valve 28 allows for the full withdrawal of all trapped air and saliva, whereby the negative pressure is greatly increased. This, in turn, greatly increases the cohesion and retention of the denture to the gingival tissues of the mouth.

Referring specifically to the upper denture plate 10, when it is in place in the mouth, the user exerts, with the tip of his tongue, a slight sucking action against the main body portion 46 to open the valve 44. By opening the valve 44, that is, moving the main body portion 46 from away from the discoidal element 30, air and saliva are drawn from between the denture plate 10 and the gingival tissues through the openings 40. Removal of the tongue from the main body portion 46 permits the valve 44 to close against the discoidal element 30 through the action of the spring 54, thereby preventing air from re-entering between the upper denture 10 and the gingival tissues, whereby a negative pressure is quickly established and maintained. The acrylic cover plate 18 is generally isosceles in configuration and it has been found that a length of 25 mm. for each side of the plate proves to be most satisfactory. However, these dimensions will vary, depending upon the shape and size of the patient's palate. The cover member 18 is disposed substantially at 0.5 mm. below the level of the palatal tissue in order that the palatal tissue immediately overlying the cover member 18 may be slightly drawn into the recess 14 during the application of the negative pressure, thereby increasing the retention values of the denture 10.

The diametrically-opposed cylindrical recesses 60 afford two engaging means whereby the main body portion 46 may be manually manipulated to open and close the valve 44 for cleaning and other maintenance operations.

The lower denture plate is designated, in general, by the reference numeral 80, reference being made to FIGURES 6 and 7 of the drawings. FIGURE 6 is a top plan view of the lower denture plate 80, while FIGURE 7 is a bottom plan view thereof or of the gingival facing side of the denture plate 80. The lower denture plate 80 is cut away or recessed, as at 82, in an elliptical configuration and is approximately 12 mm. long and 4 mm. wide. Underlying this recess is an oval cavity 84 in juxtaposition relative to the gingival tissues of the mouth and of a depth substantially 0.5 mm. This provides a receptacle permitting the gingival tissue immediately underlying this area to be slightly drawn within the cavity 84 upon the presence of negative pressure or vacuum therein.

The cavity 84 is traversed by a normally horizontal wall 86 also having a substantially oval configuration and through which extend a plurality of passages 88 which communicate at their respective upper ends with a substantially cylindrical chamber 90 and the chamber 90 is undercut as at 92 and opens into the recess 82. The plate 80, in the recess 82 is formed with a pair of oppositely-disposed, spaced and confronting hold-down lugs 94 located along the major axis of the cavity 84.

A check valve assembly is designated, generally, by reference numeral 96 in FIGURE 11. As before, the valve assembly includes a substantially discoidal element 98 having a circumferential sidewall 100 projecting laterally from a side thereof and at its peripheral marginal edge. The outer end of the side wall 100 terminates in an outwardly-extending milled circumferential flange 102. The central portion of the discoidal element 88 is expressed toward the flange 102 to form a sidewall 104 and a bottom wall 106. The bottom wall 106 is formed with a plurality of openings 108 extending transversely therethrough and also includes a centrally-located substantially hollow cylindrical boss 110.

The valve assembly 96 also includes a substantially cylindrical valve 97 having a main body portion 112 which terminates, at its lower end, in a circumferential flange 114 over which is superimposed a rubber washer 116. The main body portion 112 is, as before, provided with a pair of diametrically-opposed forcep-receiving cylindrical openings 118 to assist in the assembly and disassembly of the valve assembly 96, and the flange 114 and main body portion 112 have such dimensions as to overlie the openings 108 when the valve 96 is assembled. The lower end of the valve 97 is formed with a centrally-located axially-extending cylindrical valve stem 120 which is received for reciprocation in the boss 110.

A valve retainer ring is designated at 122 and is centrally-apertured as at 123. The ring 122 is provided with a pair of diametrically-opposed flanges 124. With the main body portion of the valve 96 superimposed on the discoidal element 98 in the manner illustrated in FIGURE 10, the retainer ring 122 is slipped thereover and flanges 124 turned to engage below the lugs 94.

Reference numeral 126 denotes a removable insert for the lower denture plate 80. The insert 126 includes the second bicuspid and the first molar tooth of the lower dental plate 80, the insert being anchored to adjacent teeth by means of resilient spring clips 128. The insert is, of course, disposed within the cavity 82 and is formed with a gingival extending recess which receives therein the lugs 94 and the upper end of the main body portion 112 of the valve 97. The sidewall 132, at the lingual side of the insert 126, is formed with a transversley-extending substantially cylindrical opening 134 which opens into the recess 130 and is in open communication therewith.

As is clearly seen in the drawings, the openings 108 are disposed substantially at the alveolar ridge of the plate 80 to facilitate the removal of air and saliva which accumulates between the gingival side of the lower denture and adjacent portions of the gingival tissues.

In operation, the user employs a sucking action of the mouth and tongue to withdraw air and saliva accumulated between the denture and adjacent portions of the gingival tissues, the air and saliva being drawn through the openings 108 past the flange 114 and the main body portion 112 of the valve 97. The air and saliva are carried upwardly into the recess 82 and the recess 132 and is expelled through the opening 134 into the mouth. The valve 97, in opening under the presence of negative pressure created by the mouth and tongue, opens away from the openings 108 to permit the passage of the air and saliva. The valve 97, in opening, normally moves upwardly, the valve stem 120 riding within the boss 110. In moving upwardly the rubber washer 116 becomes compressed against the ring 122. Immediately upon restoration of normal atmospheric pressure to the mouth, the valve 97 will close, thereby preventing the entry of air and saliva through the opening 134 and maintaining in the recess 82 a negative or vacuum pressure. The valve 97 closes, of course, under the force of gravity, but the downward movement is initially aided by the expansion of the washer 116. While negative pressure is temporarily present in the cavity 82, at the time the suction is created, it will be understood, of course, that due to the presence of the cylindrical opening 134 atmospheric pressure is soon re-established therein. However, during the establishment of the vacuum in the cavity 82 and the cavity 84, air and saliva will continue to pass through the openings 88 and the openings 108 until the vacuum is destroyed, the mouth being brought to atmospheric pressure. Air at atmospheric pressure, of course, passes through the opening 134 filling the recess 82. As this occurs, the valve 97 descends to overlie the openings 108, whereby the valve 96 is closed.

The negative pressure or partial vacuum which is established on the upper denture 10 may be readily and easily released by inserting the index finger into the mouth to cause the tip of the nail to slide over the flat circular side 48, thereby moving the main body portion 46 of the valve 44 away from the discoidal element 30, thereby permitting air to move through the valve 28. The negative pressure on the lower denture plate 80 may be quickly eliminated by simply puffing air into the lower cheek and allowing it to enter beneath the denture. This method is commonly used in the conventional lower plate dentures not equipped with dental valves.

It should be further noted that in the use of conventional upper dentures, the wearer places the same in the mouth and with his thumbs, applies an upward pressure on the bicuspid and molar teeth, in an attempt to expel trapped air and saliva trapped between the tissue side of the denture and the roof of the mouth. This action merely expels a small part of the trapped air and saliva, and for the most part, merely compresses the trapped air and saliva and is thus, ineffective. A denture employing a check valve 44 in accordance with this invention easily allows all such trapped air and saliva to be withdrawn.

Again, and with reference to the upper denture 10, the wearer, depending upon the shape of his palate and the accuracy of reproduction of the denture to the palate tissues, will generally be able to obtain sufficient negative pressure between the denture and palate by merely placing the denture in position and exerting the common upward pressure with his thumbs, allowing the trapped air and saliva to escape through the valve which would automatically open with the application of this pressure, and thereby, requiring no additional negative pressure which would be obtained by a sucking action of the tongue on the discoidal element 46.

Having described and illustrated two embodiments of this invention, it will be understood that the same is offered merely by way of example, and that the invention is to be limited only by the scope of the appended claims.

What is claimed is:

1. A dental plate comprising a palate plate having a cavity at the palatal side thereof, a cover member extending across said cavity, said cover member having a plurality of passages extending transversely therethrough, said palate plate having an opening extending transversely therethrough in open communication with said cavity and the lingual side of said palate plate, a discoidal member disposed within said passage, said discoidal member having a plurality of openings extending transversely therethrough, a valve assembly including a valve having a main body portion adapted for movement toward and away from said discodial member for extension across said openings formed in said discoidal member when said valve is in its closed position, and means connected with said valve constantly biasing said valve for movement toward its closed position.

2. A dental plate comprising a palate plate having a cavity at the palatal side thereof, a cover member extending across said cavity and being recessed within the palatal side of said dental plate, said cover member having a plurality of passages extending transversely therethrough, a passage having its opposed ends opening, respectively, into said cavity and the lingual side of said palate plate, a discoidal member, said discoidal member having a plurality of openings extending transversely therethrough, a valve having a valve stem projecting laterally from a side thereof, said valve extending across said openings formed in said discoidal member when said valve is in its closed position, said valve stem extending through said discoidal member, and spring means having an end thereof fixedly connected to said valve stem and the other end thereof engaging against said discoidal member whereby said valve is constantly biased toward its closed position.

3. A lower dental plate, said lower dental plate having a downwardly-extending recess formed therein underlying the normal position of the second bicuspid and first molar tooth, said lower dental plate having a plurality of passages opening at opposed ends thereof, respectively, into said recess and the gingival side of said dental plate, said dental plate having a chamber formed therein disposed intermediate said recess and said passages, a discoidal member disposed within said chamber and fixedly secured to said dental plate, said discoidal member having a plurality of openings extending transversely therethrough, and valve means normally disposed in said chamber and extending across said openings when said valve is in its closed position.

4. A lower dental plate, said lower dental plate having a downwardly-extending recess formed therein underlying the normal position of the second bicuspid and first molar tooth, said lower dental plate having a plurality of passages opening at opposed ends thereof, respectively, into said recess and the gingival side of said dental plate, said lower dental plate having a chamber formed therein interposed between said passages and said recess, a discoidal member disposed within said chamber and fixedly secured to said lower dental plate, said discoidal member having a plurality of openings extending transversely therethrough, a valve normally extending across said openings formed in said discoidal member when said valve is in its closed position, and a valve guide and retainer ring fixedly secured to said lower dental plate to receive said valve for reciprocation therethrough, and an insert for said recess, said insert having a passage extending transversely therethrough communicating at one end with the interior of said recess and at its other end with the lingual side of said lower dental plate.

5. A lower dental plate as defined in claim 4, wherein said insert includes simulated teeth shaped to correspond to the second general bicuspid and first molar tooth, and means anchoring said insert to adjacent teeth of said dental plate.

6. A lower dental plate comprising a base member and teeth held therein and having opposed cavities on the gingival and lingual sides of the base member; an insert having a downwardly opening recess in open communication with one end of the lingual cavity and opening towards the gingival side of said base member, a wall extending between and demarking the adjacent ends of said cavities, said wall having a plurality of passages extending vertically therethrough affording communication between said cavities, and normally closed check valve means mounted on said insert and in said lingual cavity, said check valve means controlling fluid flow between said cavities.

References Cited

UNITED STATES PATENTS

| 1,510,538 | 10/1924 | Berthold | 32—3 |
| 2,003,891 | 6/1935 | Kaczmarek | 32—3 |
| 2,897,594 | 8/1959 | Kopec et al. | 32—3 |

LOUIS G. MANCENE, *Primary Examiner.*

S. NATTER, *Assistant Examiner.*